(12) United States Patent
Amico

(10) Patent No.: US 12,287,904 B2
(45) Date of Patent: *Apr. 29, 2025

(54) SYSTEM AND METHOD FOR GENERATING DYNAMICALLY VARIABLE MULTI-DIMENSIONAL PRIVACY RATING FOR VEHICLES

(71) Applicant: Privacy4Cars, Inc., Kennesaw, GA (US)

(72) Inventor: Andrea Amico, Kennesaw, GA (US)

(73) Assignee: Privacy4Cars, Inc., Kennesaw, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,956

(22) Filed: Dec. 29, 2023

(65) Prior Publication Data

US 2024/0135032 A1    Apr. 25, 2024

Related U.S. Application Data

(63) Continuation of application No. 17/350,698, filed on Jun. 17, 2021, now Pat. No. 11,921,886.

(51) Int. Cl.
*G06F 21/00* (2013.01)
*G06F 18/2113* (2023.01)
(Continued)

(52) U.S. Cl.
CPC ...... *G06F 21/6245* (2013.01); *G06F 18/2113* (2023.01); *G06F 18/214* (2023.01); *G06N 3/08* (2013.01)

(58) Field of Classification Search
CPC ............... G06F 18/2113; G06F 18/214; G06F 21/6245; G06N 3/08
See application file for complete search history.

(56) References Cited

U.S. PATENT DOCUMENTS 9,609,025 B1    3/2017 Betzler
10,747,898 B2   8/2020 Cai
(Continued)

FOREIGN PATENT DOCUMENTS

WO    WO 2021026411    2/2021

OTHER PUBLICATIONS

International Search Report for PCT/US2022/080783, issued Mar. 8, 2023.
(Continued)

*Primary Examiner* — Rodman Alexander Mahmoudi
(74) *Attorney, Agent, or Firm* — King & Spalding

(57) ABSTRACT

Generating, using artificial intelligence algorithms and a training dataset, at least one machine learning model that is configured to generate scores for multiple attributes of one or more personal data handling approaches associated with a vehicle and/or an in-vehicle unit of the vehicle that handles personal data of a user. The training dataset comprises labelled documents that define the personal data handling approaches, each labelled document having scores pre-assigned to one or more of the multiple attributes of the respective personal data handling approach. Determining one or more personal data handling approaches associated with a target vehicle linked to received vehicle identification information and at least one in-vehicle unit of the target vehicle that handles personal data of the user. Performing semantical analysis of the personal data handling approaches. Generating, using the machine learning model and the personal data handling approaches that have been semantically analyzed, scores for the multiple attributes of each of the one or more personal data handling approaches. Processing the scores to generate a privacy score for the target vehicle, which can be dynamically adjusted for the target vehicle based on privacy change factors.

20 Claims, 8 Drawing Sheets

(51) Int. Cl.
*G06F 18/214* (2023.01)
*G06F 21/62* (2013.01)
*G06N 3/08* (2023.01)

(56) References Cited

U.S. PATENT DOCUMENTS

| | | | |
|---|---|---|---|
| 10,824,758 | B2 | 11/2020 | Hankeln et al. |
| 10,915,638 | B2 | 2/2021 | Czaplewski et al. |
| 10,956,586 | B2 | 3/2021 | Sadeh et al. |
| 11,113,415 | B1 | 9/2021 | Amico |
| 11,157,648 | B1 | 10/2021 | Amico |
| 11,256,827 | B2 | 2/2022 | Amico |
| 11,494,514 | B1 | 11/2022 | Amico |
| 11,651,105 | B2 | 5/2023 | Amico |
| 2004/0025053 | A1 | 2/2004 | Hayward |
| 2004/0166812 | A1 | 8/2004 | Lumelsky |
| 2005/0196016 | A1 | 9/2005 | Saro |
| 2007/0124046 | A1 | 5/2007 | Ayoub |
| 2010/0211770 | A1 | 8/2010 | Alrabady |
| 2010/0291880 | A1 | 11/2010 | Feldstein |
| 2013/0017816 | A1 | 1/2013 | Taity |
| 2013/0060820 | A1 | 3/2013 | Bulusu |
| 2014/0101784 | A1 | 4/2014 | Shukla |
| 2014/0134947 | A1 | 5/2014 | Stouder-Studenmund |
| 2015/0039738 | A1 | 2/2015 | Subramani |
| 2015/0317484 | A1 | 11/2015 | Bowden |
| 2016/0034590 | A1 | 2/2016 | Endras |
| 2016/0034712 | A1 | 2/2016 | Patton et al. |
| 2016/0057790 | A1 | 2/2016 | Sim |
| 2016/0128016 | A1 | 5/2016 | Avary |
| 2016/0253348 | A1 | 9/2016 | Mauu ti, Jr. |
| 2017/0046533 | A1 | 2/2017 | Retter |
| 2017/0132157 | A1 | 5/2017 | Makke |
| 2018/0302762 | A1 | 10/2018 | Dowlatkhah et al. |
| 2019/0274018 | A1 | 9/2019 | Mosenia et al. |
| 2019/0310650 | A1* | 10/2019 | Halder ............... G06N 3/08 |
| 2020/0039525 | A1 | 2/2020 | Hu |
| 2020/0098049 | A1 | 3/2020 | Jack |
| 2020/0169564 | A1 | 5/2020 | Tanriover et al. |
| 2020/0285761 | A1 | 9/2020 | Buck et al. |
| 2020/0334928 | A1 | 10/2020 | Bourke et al. |
| 2021/0182402 | A1 | 6/2021 | Balu |
| 2021/0303705 | A1 | 9/2021 | Serdar et al. |
| 2021/0406303 | A1* | 12/2021 | Kim ................. B60K 35/00 |
| 2022/0198054 | A1 | 6/2022 | Picos |
| 2022/0374895 | A1* | 11/2022 | Pratz ............... G06Q 20/308 |
| 2022/0405418 | A1 | 12/2022 | Amico |
| 2023/0214521 | A1 | 7/2023 | Amico |
| 2023/0214604 | A1 | 7/2023 | Amico |
| 2023/0244814 | A1 | 8/2023 | Amico |

OTHER PUBLICATIONS

International Search Report for PCT/US2022/032313, issued Sep. 21, 2022.
International Preliminary Report on Patentability for PCT/US2022/032313, issued Dec. 14, 2023.

* cited by examiner

SYSTEM AND METHOD FOR GENERATING DYNAMICALLY VARIABLE MULTI-DIMENSIONAL PRIVACY RATING FOR VEHICLES

RELATED APPLICATIONS

This application is a continuation of U.S. patent application Ser. No. 17/350,698, filed Jun. 17, 2021, the entirety of which is fully incorporated herein by reference.

TECHNICAL FIELD

Embodiments of the present disclosure relate to connected devices, and particularly to a system and method to generate dynamically variable multi-dimensional privacy rating for vehicles.

BACKGROUND

Over the past two decades, the automotive industry has witnessed huge transformation and advancement of technology to enhance the in-vehicle experience of a user. While such advancements provide enormous safety, convenience, and other important benefits that enhance the in-vehicle experience of the user; very little is being done to protect data that is either generated by and/or used by the vehicles in the process of enhancing the in-car experience. Such data is confidential and/or personal to a user of the vehicle; and users today are increasingly concerned with privacy of their data. Users want to have control over, protect, and maintain privacy of such personal data to avoid privacy threats such as identity theft.

Conventional privacy rating technologies used in association with apps and/or websites are one-dimensional because the interactions of users with such apps and/or websites are highly standardized. That is, data handling is the same across different apps and/or websites. But data handling for vehicles is multi-dimensional; and more diverse, complex, and non-standardized compared to websites and apps. Further, vehicles have multiple approaches associated therewith that govern the data handling. For example, in addition to personal data handling approaches associated with the manufacturer of the vehicle, each in-vehicle device and services that handle the personal data of the user may have their own personal data handling approaches that are different from each other and that of the manufacturer. Often, the different personal data handling approaches are highly non-transparent to the user. Also, conventional privacy rating technologies fail to meaningfully engage the manufacturers and/or the entities that handle personal data of the user in a vehicle to improve their personal data handling approaches. There is a need in the art to address these data privacy and protection deficiencies in the automotive industry.

This background information is provided to reveal information believed to be of possible relevance to the present disclosure. No admission is necessarily intended, nor should be construed, that any of the preceding information constitutes prior art against the present disclosure.

BRIEF DESCRIPTION OF FIGURES

The foregoing and other features and aspects of the present disclosure are best understood with reference to the following description of certain example embodiments, when read in conjunction with the accompanying drawings, wherein.

Figure 1:
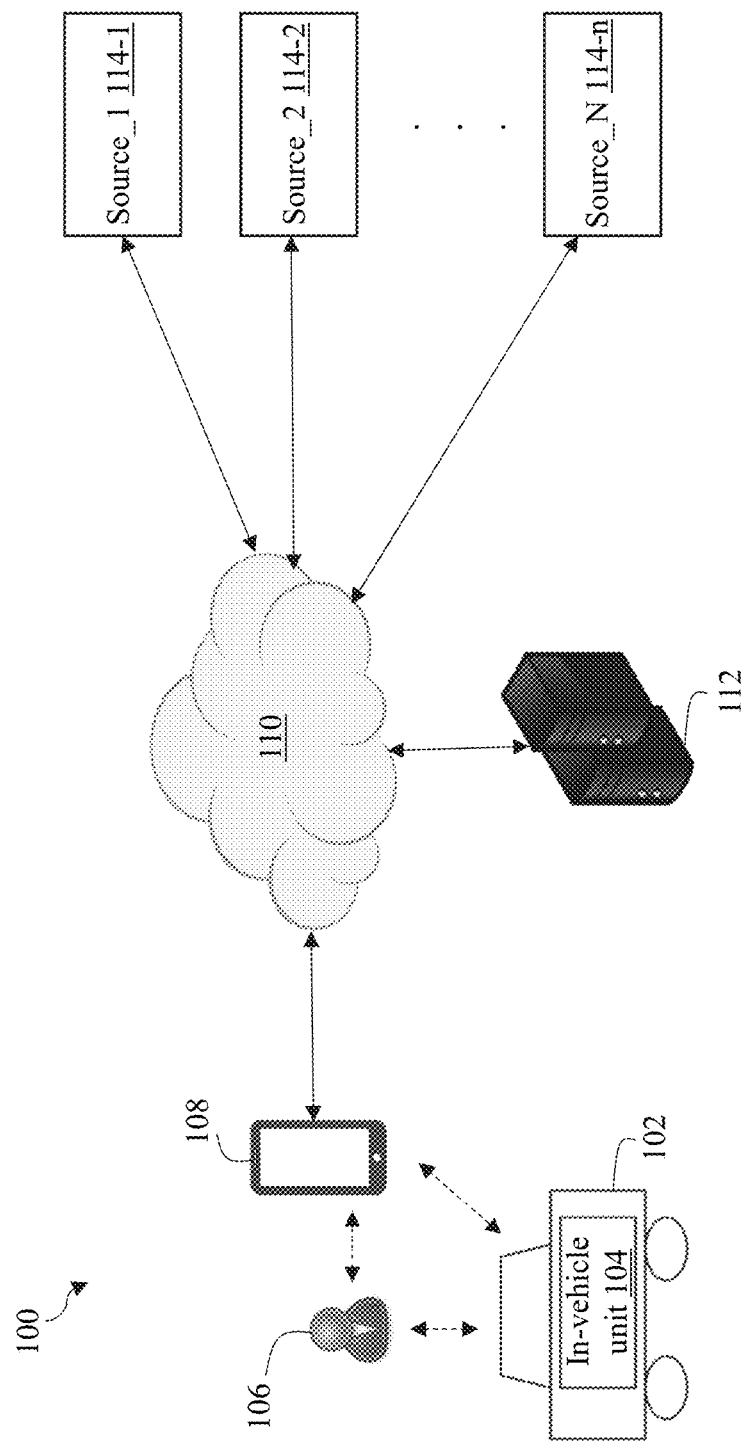
FIG. 1 illustrates an example operating environment of a privacy score generation system, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION

The present disclosure describes a method, apparatus, and/or system that provides a technical solution rooted in computer technology—machine learning and natural language processing—to address one or more technical problems of data security and data privacy risks in vehicles. Such technical problems include, but are not limited to, the lack of existing technology that provides a platform for users to determine privacy risks associated with a vehicle; the inability of existing one-dimensional and static privacy scoring technologies used in other sectors to effectively capture the complexity involved with data security in vehicles; etc. Further, the method, apparatus, and system of the present disclosure is configured to provide practical applications of, inter alia, (a) making privacy transparent and visible to a user by providing a platform to easily and accurately obtain an assessment of privacy risks related to the personal data of the user in association with a vehicle without having to read and comprehend thousands of pages of privacy policies, (b) providing a breakdown of the privacy risk assessment of each in-vehicle units that handles personal data of the user, (c) providing options to users to take control of their personal data when interacting with a vehicle, etc.

In the following paragraphs, a system, method, and apparatus for obtaining a multi-dimensional and dynamically variable privacy rating for a vehicle using artificial intelligence (hereinafter 'vehicle privacy system') will be described in further detail by way of examples with reference to the attached drawings. In the description, well known components, methods, and/or processing techniques are omitted or are briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

In one example, a vehicle privacy system ('system') of the present disclosure determines a vehicle and in-vehicle units of the vehicle that handle personal data of a user. Further, the system determines entities associated with the vehicle and/or the in-vehicle units that handle the personal data of the user. Then, the system determines and retrieves personal data handling approaches of each entity. Responsive to retrieving the personal data handling approaches, the system uses natural language processing and machine learning to analyze the retrieved personal data handling approaches and rate at least one attribute associated with each personal data handling approach. The system assigns weights to the various attributes of each personal data handling approach. The weights may be assigned based on at least one of user preferences and various privacy elements associated with the vehicle and/or the in-vehicle units. The system combines the weights and the ratings of the attributes of each personal data handling approach. Then, the weighted ratings of each personal data handling approach are used to generate a privacy rating for the vehicle. Further, the system is configured to dynamically adjust the privacy rating of the vehicle based on privacy change factors such as, but not limited to, usage status of the various in-vehicle units, personal data handling practices of the entities associated with the vehicle and/or the in-vehicle units that handle the personal data of the user, etc. It is noted that the privacy rating may be published in a number of places including, but not limited to, online platforms, at dealerships, at rental vehicle centers, on the vehicle stickers, etc.

Before discussing the example embodiments directed to the vehicle privacy system, it may assist the reader to understand the various terms used herein by way of a general description of the terms in the following paragraphs.

The term "in-vehicle unit" may generally refer to any hardware device and/or software module that is integrated with, embedded in, or attached to a vehicle; and that handles personal data of a user. The in-vehicle units may include modules or devices that are included in the vehicle from the factory and/or aftermarket modules or devices attached to the vehicle. Examples of in-vehicle units of a vehicle may include, but is not limited to, infotainment units, navigational units, Bluetooth units, garage door opener units, driver safety units, safe driving assistance units, telematics units, etc.

The term "handle" or "handling" as used herein in the context of personal data may generally refer to any appropriate interaction with the personal data of a user in a way that may affect the privacy of the personal data. Examples of handling personal data may include, but are not limited to, receiving, retaining, sharing, transmitting, using, selling, controlling, etc.

The term "personal data handling approaches" may generally refer to any appropriate information that discloses/defines procedures, practices, or rules associated with handling personal data of a user. Said information may include, but is not limited to, a privacy policy, Terms of Services (ToS), other documented privacy practices, etc. Further, said information may include data that is not available in privacy policies, ToS, and/or documented privacy practices and features such as, but not limited to, information regarding features associated with an in-vehicle unit or the vehicle that allow a user to opt in or opt out of the user's personal data being handled, features that indicate to a user that an in-vehicle unit is collecting data, interactive features that allow user to take control of the user's personal data, documents that inform the user of such features related to privacy, etc. For example, a visual cue such as an icon that indicates to a user that personal data is being collected and shared; graphical control elements such as check boxes or radio buttons that a user can interact with to opt out of personal data being used; etc. Such information that is not available in privacy policies or ToS's may be ascertained by manual inspection of and/or interaction with the vehicle and in-vehicle devices. Additionally, such information may be received from crowd source platforms, manufacturers, third parties, etc.

It is noted that, the term "personal data handling approaches associated with a vehicle and/or in-vehicle unit" may refer to personal data handling approaches of any appropriate entities associated with the vehicle and/or in-vehicle unit that handle personal data of the user. For example, if the vehicle associated with the user is a Mazda Miata; the personal data handling approaches associated with Mazda Miata may refer to and include, but are not limited to, the privacy policy of Mazda Motors in general, the privacy policy of Mazda Motors specific to Miata model, the privacy policy of Bose infotainment system in the Mazda Miata, privacy policy associated with Sirius XM service provider, privacy policy associated with Progressive insurance if a Progressive telematics device is installed or if Progressive insurance covers the Mazda Miata vehicle associated with the user, privacy policy associated with the specific Mazda dealership where the vehicle is serviced, privacy policy of the dealership/agency from where the vehicle was purchased or rented (if rental vehicle), etc.

The term "attributes" as used herein in association with personal data handling approaches may include, but is not limited to, accessibility, availability, breadth/extent, complexity, etc., of the personal data handling approaches. Further, the term 'attributes' may include various data privacy aspects such as, but not limited to, data collection, protection of children, third party sharing, data security, data retention, data aggregation, control of data, privacy settings, account deletion, privacy breach notifications, policy changes, country, contact information, use/purpose of information, etc. The term "privacy elements" may refer to, inter alia, vehicle dealership details and policies, data regarding whether the vehicle is owned, rented, or leased, etc.

The term "privacy rating" as used herein may refer to a numeric score, a letter grade, or other indicator that may be assigned to a particular vehicle based on the personal data handling approaches and/or the privacy elements associated with the vehicle and/or in-vehicle units of the vehicle that handle personal data of the user. The privacy rating may represent a valuation of the quality of the personal data handling approaches with respect protection and privacy of the personal data of the user. The privacy ratings may be presented in any appropriate format that allows users to quickly assess privacy risks associated with a particular vehicle. For example, the privacy ratings may be presented as a star rating within a range such as from one star to five stars. In other examples, the privacy ratings may be presented as number within an explicit range (e.g., 0-100). In yet other example, the privacy ratings may be presented as a grade, such as a letter grade (e.g., A+, A, A−, B+, B, B−, . . . , D−, F). The privacy ratings may reflect the strengths, limitations, and weaknesses of data privacy (or personal data handling approaches) with respect to a vehicle.

The term 'personal data' as used herein may generally refer to any information associated with a user that the user does not want an unauthorized party to access, and/or data that connects back to and uniquely identifies a user. For example, the personal data may include the home and/or business address for the user and a contact list of individual names, addresses, phone numbers, passwords, etc. Personal data may further include navigational data, such as locations that the user driver to and from (e.g., a home or business or other points of interest), driver habits, etc. Personal data may also include financial information, such as a bank account number or credit card number, corresponding to the user of the vehicle.

Referring now to FIG. 1, a privacy rating system is depicted and generally designated 100. The privacy rating system 100 may include a vehicle 102 having one or more in-vehicle modules 104 that may handle personal data of a user 106 when used for various operations, such as, making phone calls, getting navigation information, paying toll, initiate safety assistance, initiate driving assistance such as auto-pilot or self-drive function, etc.

The vehicle 102 may include, but is not limited to, one of a number of different types of automobiles or motor vehicle, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD), hybrid vehicles, electric vehicles, motorcycles, etc.

Further, the user 106 may include either a private owner of the vehicle, other users who are related to and are authorized by the private owner to use the vehicle (e.g., spouse, kids, friends, etc.), an individual who leases or rents the vehicle from a dealership or a rental agency, an employee of the dealership or rental agency, etc. In some example embodiments, the user 106 may be an entity, such as a rental agency, dealership, etc. The user 106 may have a user computing device 108. The user computing device 108 may be a portable computing device having display, user interaction, and/or network communication capabilities (e.g., Internet connectivity), such as, a mobile phone, a laptop, a tablet, a smart phone, any other appropriate hand held device, etc. In some example embodiments, the user computing device 108 may also include a desktop or a computing system in-built in the vehicle that has a display, user interaction, and/or network communication capabilities. The user computing device 108 may be communicatively coupled to one or more in-vehicle units 104 of the vehicle 102.

Further, the privacy rating system 100 includes a privacy server 112. The privacy server 112 may be communicatively coupled to the user computing device 108 and one or more privacy data sources (114_1, 114_2 . . . 114_N, hereinafter collectively 114) via a network 110. In some embodiments, the network 110 may include the Internet, a public switched telephone network, a digital or cellular network, other networks, or any combination thereof. In some embodiments, the privacy data sources 114 may include entities that publish or provide (or digital/web data repositories or web servers thereof that include) their own personal data handling approaches or personal data approaches of other entities, such as, but not limited to, manufacturer of the vehicle, in-vehicle unit manufacturers, in-vehicle service providers, third party businesses with whom data is shared by the manufacturers or service providers, partners associated with the manufacturers, and/or other entities that handle personal data of the user obtained from a vehicle. The personal data handling approaches may be published or provided online/digitally.

In some embodiments, the privacy server 112 may receive data from the user computing device 108 and may provide a privacy rating to the user computing device 108 in response to the data. The privacy rating may be generated based on personal data handling approaches obtained from the privacy data sources 114 and/or at least a portion of the data received from the user computing device 108. The privacy server 112 may be configured to use artificial intelligence to generate the privacy ratings. For example, the privacy server 112 may use natural language processing to semantically analyze the personal data handling approaches (i.e., to understand what is written in the text thereof); and machine learning may be used to rate various attributes of the personal data handling approaches. The user computing device 108 may be configured to display the privacy rating on a display 310 (shown in FIG. 3), such as within an Internet browser window.

In some embodiments, the data received from the user computing device 108 may be a vehicle identification number (VIN) number that uniquely identifies a vehicle. In other embodiments, the data received may be a make, model, trim, etc., of the vehicle. In yet other embodiments, the data may include an image of the vehicle or portion of the vehicle that may be used to uniquely identify the vehicle. In one or more embodiments, in addition to data identifying vehicle, the data received from the user computing device 108 may include user privacy preferences and/or other information (secondary information) associated with the vehicle such as dealership associated with the vehicle, lease vs rent vs buy, in-vehicle units that are currently active and inactive, etc.

In some embodiments, the user computing device 108 may include a privacy client application or a privacy plugin 314 (shown in FIG. 3), which may communicate data to the privacy server 112. In some embodiments, the user computing device 104 may execute a privacy client application. The privacy client application may provide a user interface to receive data from the user 106, such as a vehicle identification number (VIN); the make, model, trim of the vehicle; an image of the vehicle or a portion of the vehicle; privacy preferences of the user 106; data regarding whether the vehicle is (or to be) leased, rented, or bought; data regarding dealership or rental agency associated with the vehicle; or any combination thereof. The privacy client application may transmit the data to the privacy server 112. In response to sending the data, the privacy client application may receive a privacy rating (associated with the vehicle) corresponding to the data and may display the privacy rating associated with the vehicle 102.

In some examples, in addition to presenting the privacy rating to the user 106 via the user computing device 108, the privacy client application may be configured to operate in conjunction with the privacy server 112 to present recommendations for other vehicles (makes, models, trims, year, etc.) having similar or different privacy ratings, or steps that the user can take to change the privacy rating for a given vehicle by activating or deactivating certain in-vehicle units or changing configurations of the vehicle, etc.

Further, in some examples, the privacy client application may provide a user interface to receive additional data from the user 106, such as requests from the user with respect to control of the user's personal data. For example, the privacy client application may provide a user interface that may allow the user 106 to request a vehicle manufacturers (e.g., Nissan, GMC, Ford, etc.) associated with the user's vehicle to delete the user's personal information that has been collected, or request a service provider such as Sirius not to store the collected data for more than a week, etc. The privacy client application may transmit the additional data to the privacy server 112, the entity responsible for addressing the user's request, and/or entities responsible for regulating personal data handling (e.g., Office of Attorney General). Based on actions taken in response to the personal data control request from the user, the privacy server 112 may be configured to adjust the privacy rating with respect to the vehicle 102. For example, if Nissan Motors complies and deletes the user's personal data in response to a user's request to Nissan Motors to delete the personal information of the user that has been collected through the user's Nissan Pathfinder vehicle, the privacy rating of Nissan Pathfinder associated with the user may be increased. If Nissan motors complies with requests from multiple users regarding Nissan Pathfinder vehicles, the privacy rating of Nissan Pathfinders may be increased in general. Similarly, in said example, if Nissan complies with a threshold percentage (e.g., at least 80%) of user requests, the privacy rating of all Nissan vehicles may be increased in general. In some examples, the additional data may indicate whether the user has activated an in-vehicle unit 104, added a new in-vehicle unit 104, or deactivated an in-vehicle unit 104. In response to sending the additional data, the privacy client application may receive an adjusted privacy rating and may display the adjusted privacy rating associated with the vehicle 102.

In some example embodiments, the user computing device 108 may execute a browser application, which may include the privacy plugin. In response to selection of a website (i.e., a uniform resource locator (URL)), the privacy plugin may send the URL to the privacy server 112 through the network 106 and, in response to sending the URL, the privacy policy plugin may receive the privacy policy score and may display the privacy policy score within the browser window. In said example embodiments with a privacy plugin 314, the user 106 may not have to explicitly input vehicle related data for the privacy server 112 to generate a privacy rating for the vehicle. Instead, the privacy server 112 may obtain the vehicle related information from the received URL. For example, if a user opens the Ford Motors webpage on the user computing device 108 and searches for a 2019 Ford Explorer, the privacy plugin may be configured to transmit the related URL to privacy server 112. In said example, the privacy server 112 may generate and provide a privacy rating for 2019 Ford Explorer to the user computing device 108 which in turn may present the privacy rating for the 2019 Ford Explorer on the 2019 Ford Explorer webpage that is opened in the user computing device 108. The privacy rating may be overlaid on the 2019 Ford Explorer webpage, provided as a pop-up, or presented in any other appropriate manner. In said example, the user does not have to explicitly type in the details regarding the vehicle 102. Instead, the privacy plugin obtains the information from the URL or webpage content and automatically generates and presents the privacy rating in concert with the privacy server 112.

In one example, the privacy server 112 may be hosted on a cloud platform. However, in other examples, the privacy server 112 may be hosted on a software as a service (SaaS) platform, or on a dedicated server in a data center without departing from a broader scope of the present disclosure.

Figure 2:
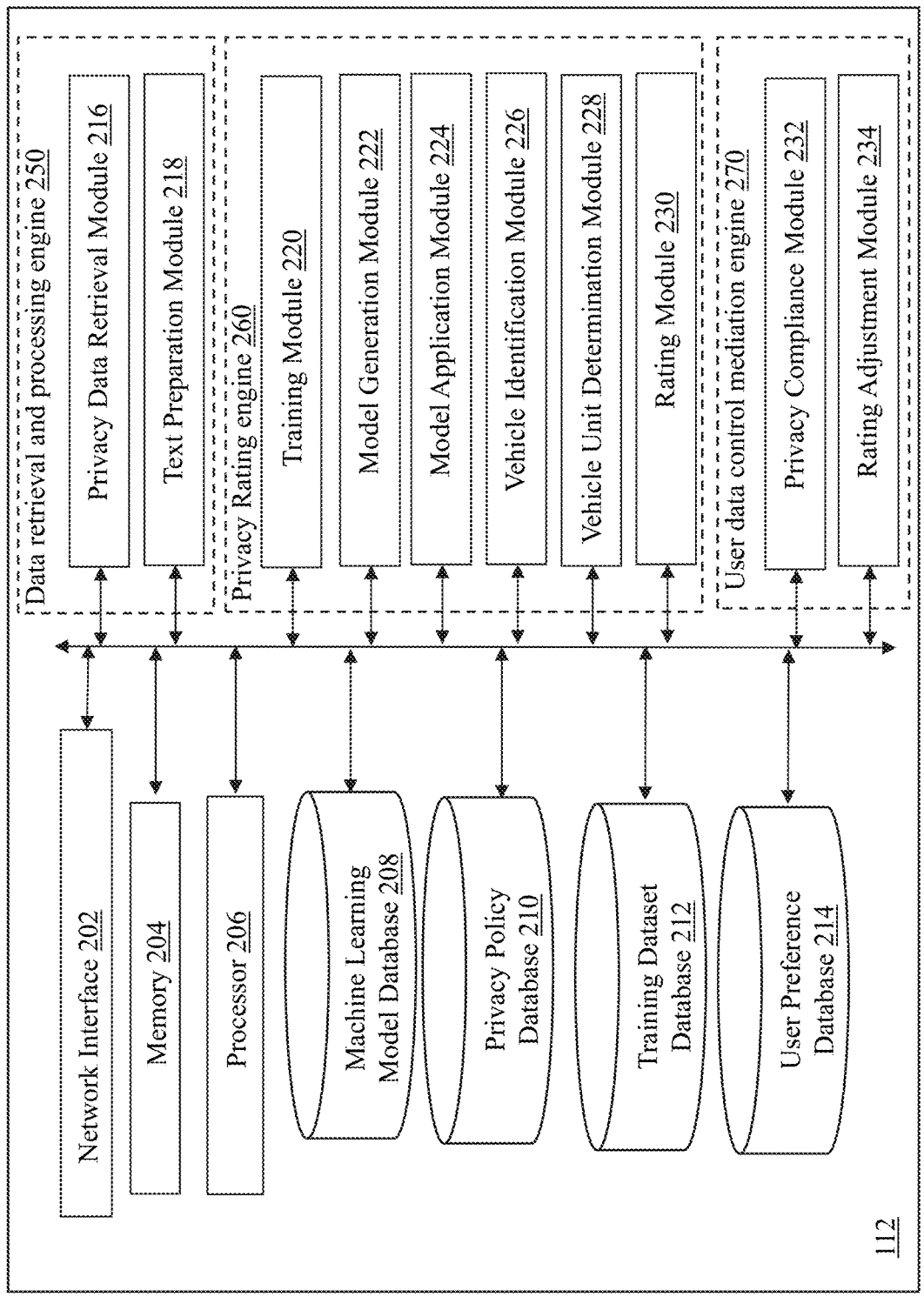
FIG. 2 illustrates an example block diagram of the privacy server of the privacy score generation system shown in FIG. 1, in accordance with example embodiments of the present disclosure.
Figure 3:
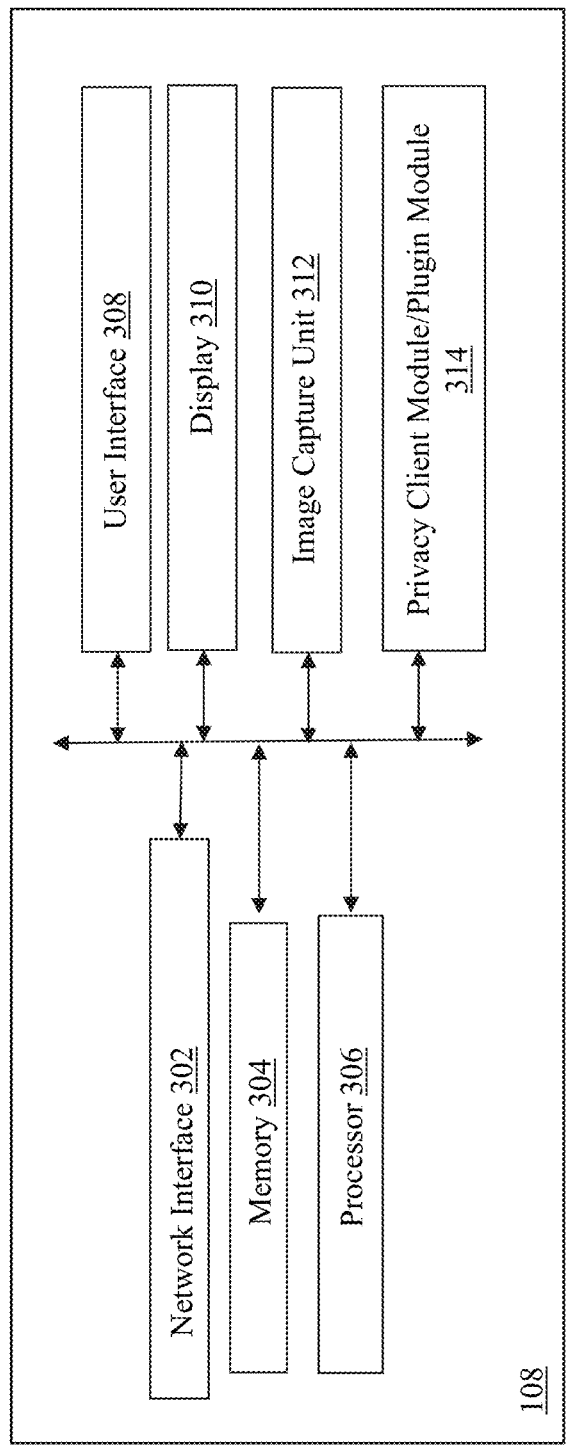
FIG. 3 illustrates an example block diagram of the user computing device of the privacy score generation system shown in FIG. 1, in accordance with example embodiments of the present disclosure.

The operation of the privacy rating system 100 will be described below in greater detail in association with FIGS. 4-6 by making reference to FIGS. 2-3 which illustrates the various example components of the privacy server 112 and the user computing device 108. As illustrated in FIG. 2, in one example, the privacy server 112 may include three engines: the data retrieval and processing engine 250, the privacy rating engine 260, and user data control mediation engine 270. The operation of the different engines (250-270) of the privacy server 112 may be explained in greater detail in association with FIGS. 4-6.

Figure 4A:
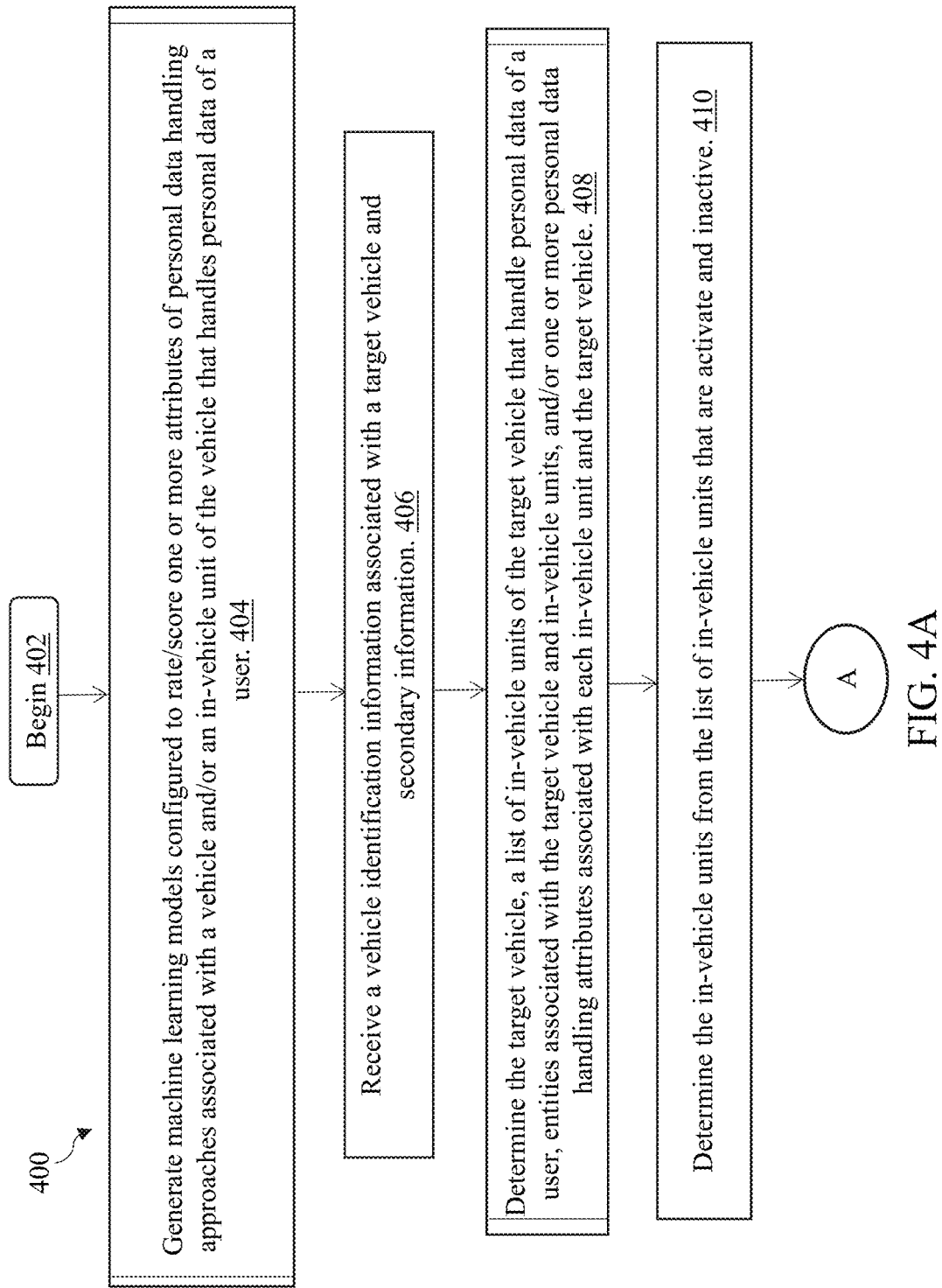
FIGS. 4A-4C (collectively 'FIG. 4') illustrate an example operation of the privacy score generation system shown in FIG. 1, in accordance with example embodiments of the present disclosure.
Figure 4B:
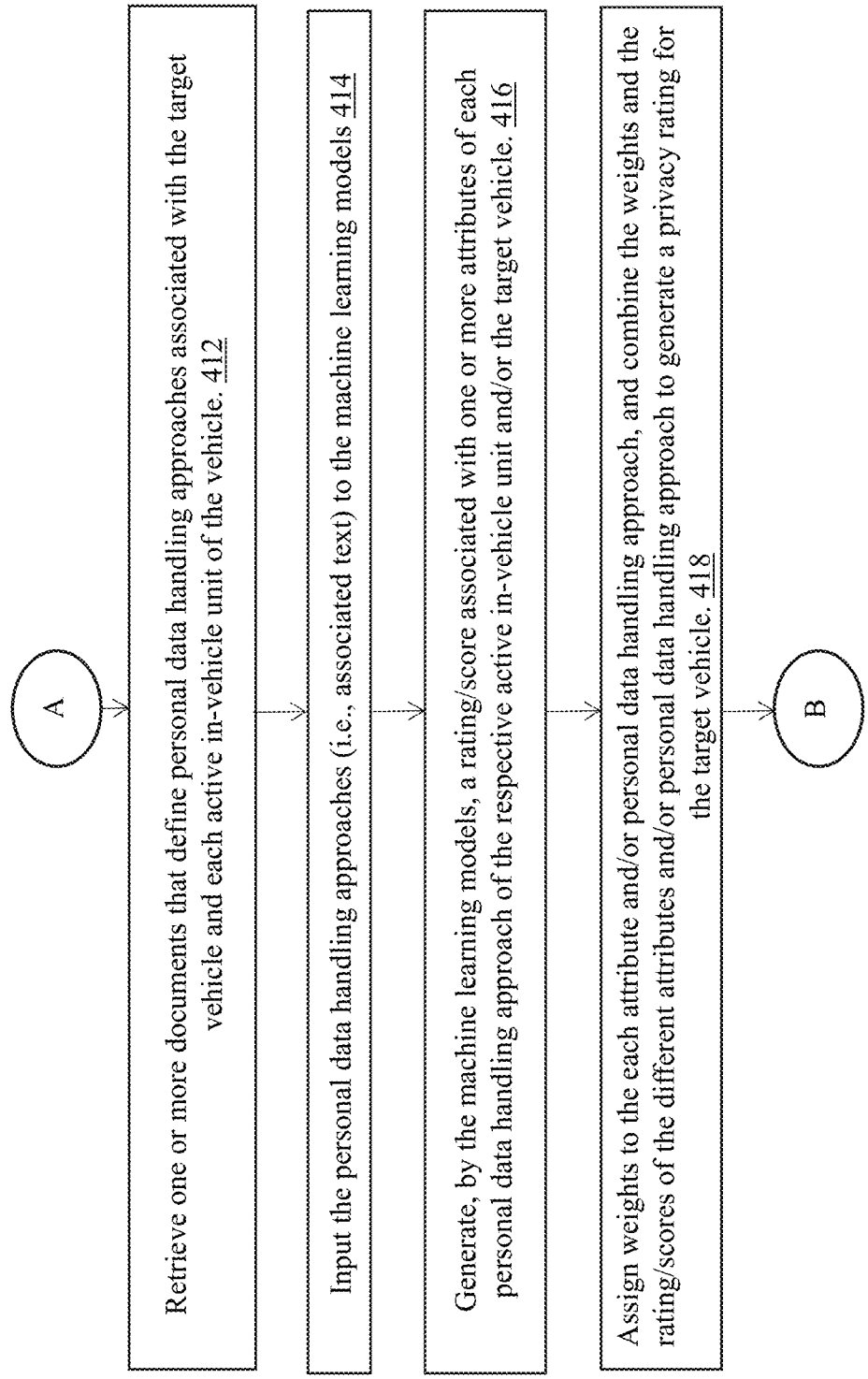
Figure 4C:
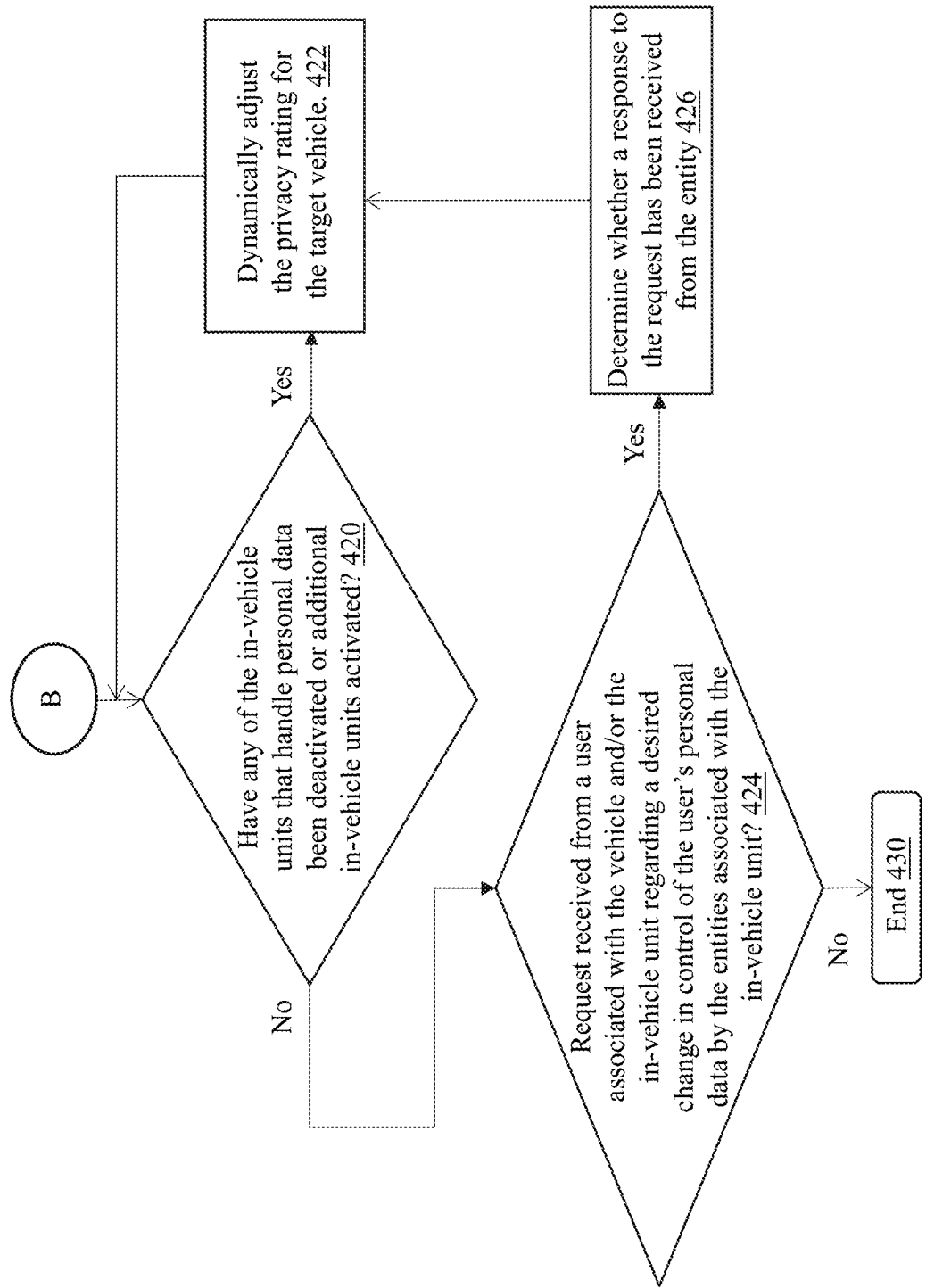
Figure 5:
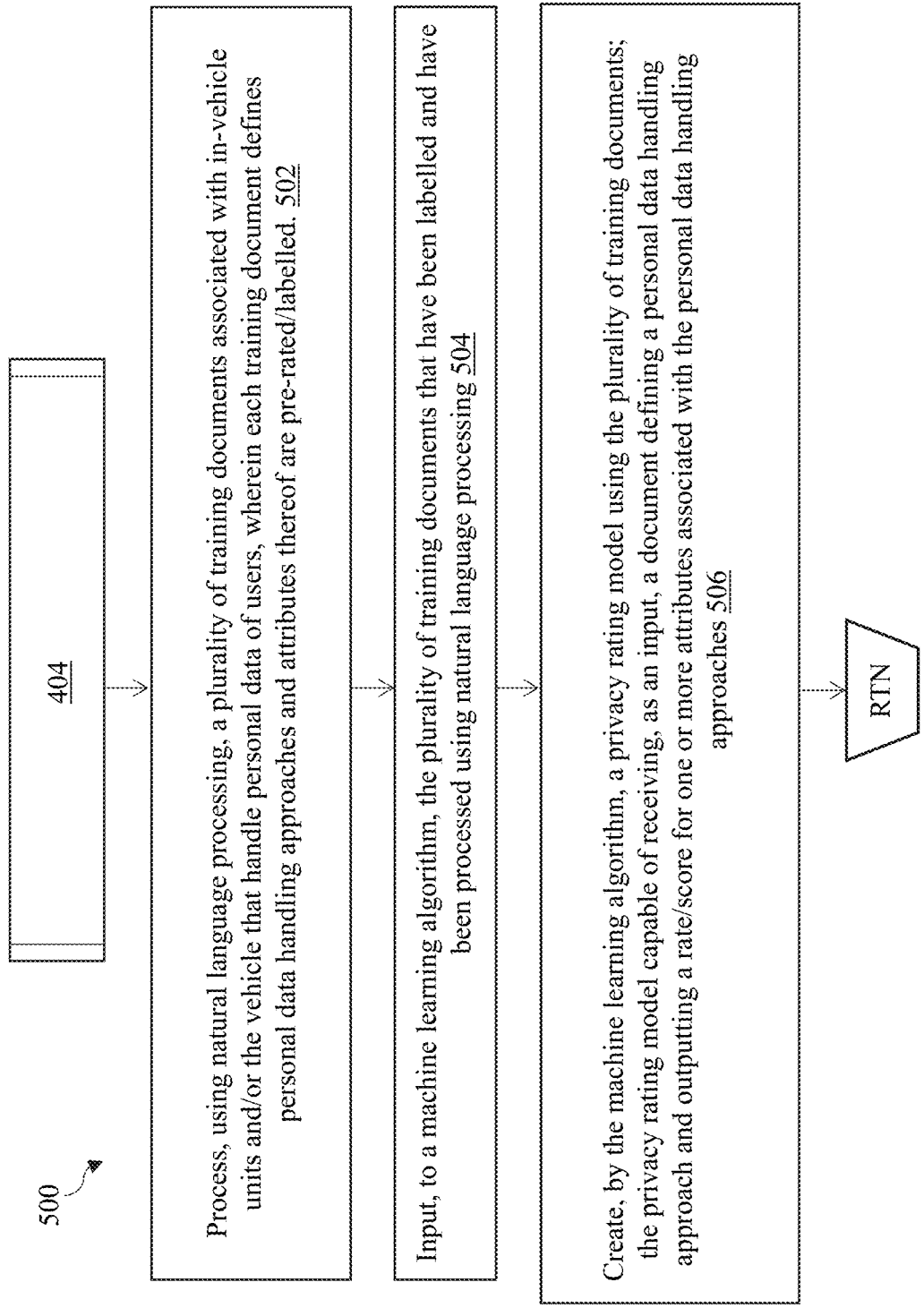
FIG. 5 illustrates an example machine learning model generation operation of the privacy score generation system, in accordance with example embodiments of the present disclosure.
Figure 6:
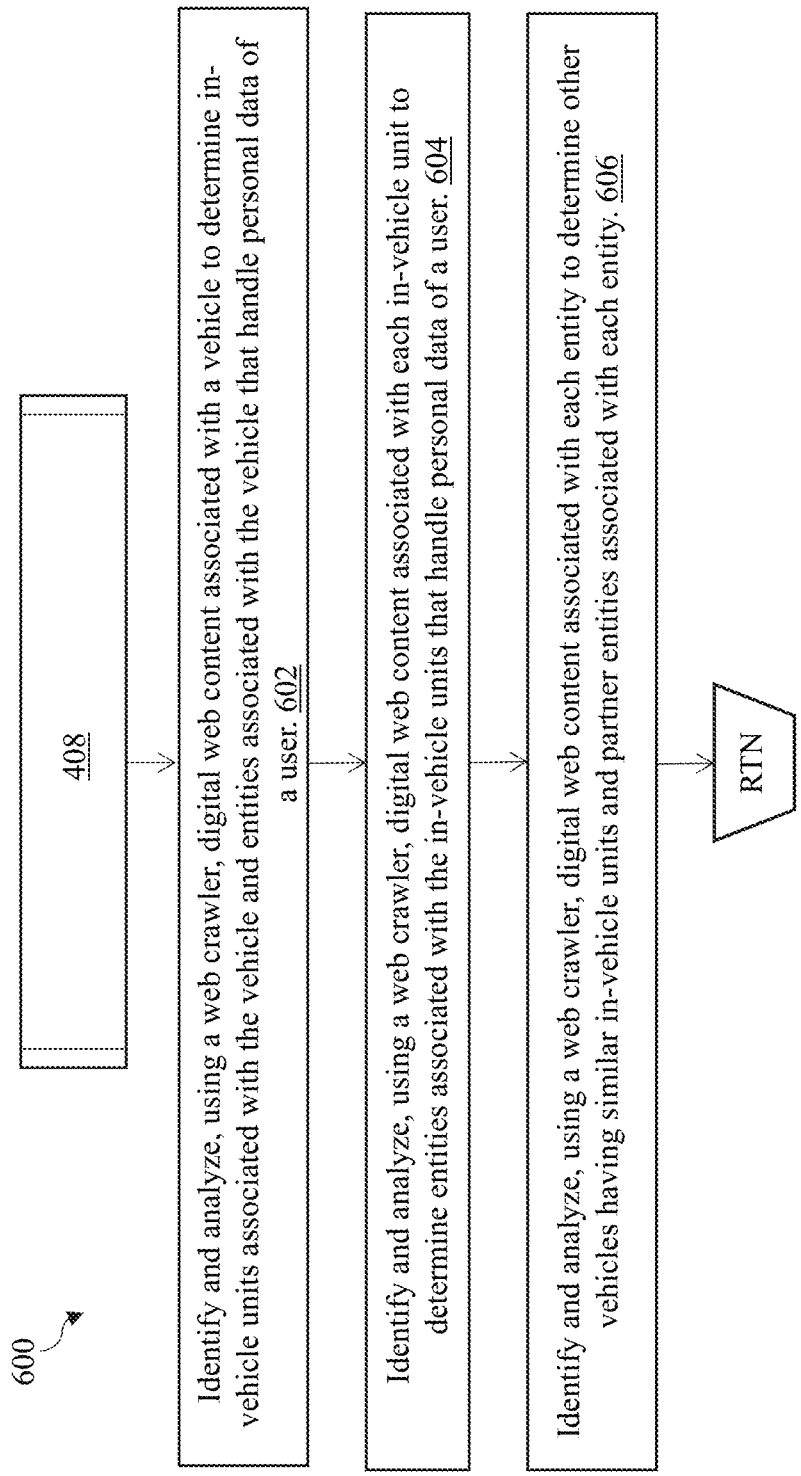
FIG. 6 illustrates an example data acquisition operation of the privacy server to determine the vehicle, the in-vehicle units of the vehicle, and entities associated with both the vehicle and the in-vehicle units that handle personal data of a user, in accordance with example embodiments of the present disclosure.

FIGS. 4-6 illustrate flowcharts associated with the operation of the privacy rating system. Although specific operations are disclosed in the flowcharts illustrated in FIGS. 4-6, such operations are only non-limiting examples. That is, embodiments of the present invention are well suited to performing various other operations or variations of the operations recited in the flowcharts. It is appreciated that the operations in the flowcharts illustrated in FIGS. 4-6 may be performed in an order different than presented, and that not all of the operations in the flowcharts may be performed.

All, or a portion of, the embodiments described by the flowcharts illustrated in FIGS. 4-6 can be implemented using computer-readable and computer-executable instructions which reside, for example, in a memory of the user computing device 108 or the privacy server 112. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the present invention as described below.

Referring to FIG. 4, the privacy rating generation process 400 of the privacy rating system 100 begins at operation 402 and proceeds to operation 404 where a training module 220 of the privacy server 112 may operate in concert with the model generation module 222 and the training dataset database 212 to train a machine learning algorithm to generate privacy rating machine learning models. The privacy rating machine learning models may be configured to rate one or more attributes associated with personal data handling approaches of a vehicle 102 and/or in-vehicle units 104 of a vehicle 102. The personal data handling approaches may include, but are not limited to, privacy policies and/or terms of services (ToS), etc. Operation 404 associated with generating the privacy rating machine learning model will be described in greater detail below, in association with FIG. 5.

Referring to FIG. 5, an example machine learning model generation process 500 of the privacy server 112 may begin at operation 502. In operation 502, the training module 220 may process a plurality of labelled documents that define the personal data handling approaches associated with vehicles 102 and/or in-vehicle units 104 (hereinafter 'labelled privacy documents') using natural language processing algorithms. In one or more example embodiments, the labelled privacy documents may include documents defining privacy policies, terms of services, or other personal data handling approaches; where various attributes associated with the privacy policies, terms of services, or other personal data handling approaches have been manually rated or scored. The various attributes associated with the privacy policies, terms of services, or other personal data handling approaches may be manually scored or rated based on, inter alia, known best practices in the industry, location of the vehicle (e.g., Europe, US, Asia, etc. —Privacy laws vary in different countries), customer perception with respect to the attributes, etc. Data regarding best practices, customer perception, etc., may be obtained from external data sources like regulatory bodies, crowdsource platforms, etc. In one example, the worst practice and best practices associated with an attribute of the personal data handling approach may be determined and assigned the lowest rating and highest rating, respectively. Then, an objective criteria may be built for the ratings that are in between the highest and lowest ratings.

The natural language processing algorithms may be configured to extract features/feature vectors and target values associated with the labelled privacy documents and/or various attributes of the labelled privacy documents. Once the labelled privacy documents have been processed via natural language processing, in operations 504-506, the training module 220 may operate in concert with the model generation module 222 to: (a) input the features/feature vectors and target values associated with the labelled privacy documents and/or various attributes of the labelled privacy documents to a machine learning algorithm, and (b) responsively generate a privacy rating machine learning model that is trained and configured to output ratings/scores for various attributes of a personal data handling approach when an unlabeled privacy document defining the personal data handling approach is provided as an input. The created machine learning models may be stored in the machine learning model database 208.

In one example, the privacy rating machine learning models created in operation 506 may be configured to rate three main attributes associated with a personal data handling approach. Further, each attribute may include sub-attributes that may be rated as well. The first attribute is related to the accessibility of the personal data handling approach. Examples of the first attribute and related sub-attributes may include, but is not limited to, whether the privacy policy can be found easily, whether the privacy policy is easily accessible and/or available, the number of different privacy policies that cover a vehicle and/or in-vehicle unit, length or number of words in the privacy policy, complexity of/ease or readability of/ability of comprehend the text of the privacy policy, layout of the privacy policy, availability of a table of contents section, etc. The second attribute is related to the data privacy aspects of the personal data handling approach with respect to highly sensitive personal data. The data privacy aspects can include, but is not limited to, data collection, protection of children, third party sharing, data security, data retention, data aggregation, control of data, privacy settings, account deletion, privacy breach notifications, policy changes, country, contact information, use/purpose of information, etc. Examples of highly sensitive personal data can include, but is not limited to, geolocation, driver habits, biometrics, etc. For example, with respect to the second attribute, a privacy policy may be rated based on whether highly sensitive personal data is being collected and/or shared for essential services (safety, travel, etc.) or non-essential services (general/targeted ad purpose), whether the highly sensitive personal data is anonymously stored (masked) in such a way that it cannot be used to recreate user privacy information or be connected to a person, etc. The third attribute is related to privacy related features associated with an in-vehicle unit or the vehicle. Examples of the privacy related features may include, but are not limited to, features that allow users to opt in or opt out of the user's personal data being handled, visual cues that indicate to a user that personal data is being collected; interactive cues that can be used to stop personal data handling, etc. In some examples, the third attribute may not be rated using a machine learning model. Instead, ratings may be pre-assigned to and stored in the privacy policy database 210 for each known privacy related features of a vehicle 102 or an in-vehicle unit 1024. Said ratings may be simply based on the presence or absence of the privacy related features.

Once the machine learning model is created, the example machine learning model generation process 500 returns to operation 406 of FIG. 4. In operation 406, the user computing device 108 may be configured to receive vehicle identification information and/or secondary information of the vehicle 102 for which the privacy score/rating needs to be generated (interchangeably referred to as 'target vehicle'). The received vehicle identification information and/or the secondary information may be transmitted to the privacy server 112.

In one example embodiment, the user 106 may access the privacy client application 314 on the user computing device 108. The privacy client application 314 may be downloaded and installed on the user computing device 108. Responsively to accessing the privacy client application 314, the processor 306 of the user computing device 108 may configured to operate in concert with the user interface module 308 and the display 312 to provide the user 106 with an interactive user interface to input the vehicle identification information and/or the secondary information. In some examples, the user interface generated by the privacy client application 314 may be configured to prompt the user 106 to input a vehicle identification number (VIN) which uniquely identifies a vehicle 102. In other examples, the user interface may be configured to prompt the user 106 to input the make, model, trim, etc., of the vehicle 102. In yet another example, the user interface may be configured to prompt the user 106 to input an image of at least a portion of the vehicle 102 such as, but not limited to, an exterior of the vehicle, a dashboard of the vehicle, etc., which can be used to uniquely identify the vehicle 102. Said image may be captured using the image capture unit 312 of the user computing device 108, or uploaded from a memory 302 of the user computing device 108 or from a web server. In some examples, the vehicle 102 may be identified using the image of the vehicle 102 or a portion of the dashboard thereof using machine learning algorithms.

In some example embodiments, in addition to the vehicle identification information, the privacy client application 314 may be configured to generate a user interface that prompts the user 106 to input secondary information. The secondary information may be associated with the vehicle 102 and may include, but is not limited to, use, ownership, sales, dealership, rental companies, etc., associated with the vehicle. For example, whether the vehicle is purchased from Carvana, or a traditional dealership, whether the vehicle is a rental vehicle, the name of the rental agency, etc. Additionally, the secondary information may be associated with preferences of the user 106 with respect to the various attributes of the personal data handling approaches. For example, the user 106 can rank data collection (e.g. name, date of birth, location, address, social security number, credit card number, etc.), behavior tracking, data gathering practice, data usage (e.g. internal use only, sell to third parties, prevent fraud, essential, non-essential, etc.), op-out policy (opt-out of any data use, opt-out of some data use, opt-out is not permitted at all), etc., associated with the personal data handling approaches (e.g., privacy policies) in an order of importance to the user 106. The privacy client application 314 may provide a user interface through which the user 106 may specify user preferences indicating what the user considers important, such as a relative importance of various attributes of a particular personal data handling approach or personal data handling approaches in general. For example, the user interface (e.g., GUI) may prompt the user through a series of questions designed to determine relative importance of various attributes of the personal data handling approaches. (e.g. "Is the collection of data for non-essential use more concerning than the data being stored indefinitely?" Yes or no.). In some embodiments, the user interface may include input fields through which a user may enter additional information that can be used to evaluate and score a personal data handling approach. The user preferences may be used to produce a weights for various attributes of the personal data handling approaches. In some examples, additional factors may be taken into account to determine the weights. For example, the country in which the vehicle is located, privacy laws in the area, etc. The weights may be used to influence the overall privacy rating/score for a vehicle 102.

The received data (secondary information and/or vehicle identification information) may be transmitted to the privacy server 112 via the network interface 302 of the user computing device 108. Additionally, a user identifier may be transmitted to the privacy server 112. The privacy server 112 may be configured to store the data received from the user computing device 108 (i.e., the user identifier, the vehicle identification information, and the secondary information) in the user preference database 214. The user identifier can be used to retrieve the user preferences for that user from the user preference database 214.

Alternatively, in operation 406, the privacy plugin 318 may be configured to automatically transmit information associated with a vehicle 102 when the user 106 accesses a vehicle related webpage via the user computing device 108. For example, the privacy plugin 318 may be configured to transmit vehicle related information when the user 106 accesses a vehicle manufacturer webpage and searches for a specific make and model of a vehicle; or the privacy plugin 318 may be configured to transmit vehicle related information when the user 106 accesses a dealership webpage, rental webpage, etc., and searches for a specific vehicle of interest to the user 108.

In some example embodiments, in operation 406, the privacy client application 314 may be configured to automatically determine the vehicle identification information and/or the secondary information. In said example embodiments, the privacy client application 314 may interact with other modules of the user computing device 104 such as Bluetooth module, Geolocation module, etc., (not shown in FIG. 3) to automatically determine the vehicle identification information and/or the secondary information.

In some example embodiments, the privacy client application 314 may interact with other modules of the user computing device 104 (as mentioned above) to automatically determine at least a portion of the vehicle identification information and/or the secondary information, and the remaining portion may be obtained from the user 106. For example, the user computing device 108 may be paired with a personal vehicle 102 of the user 106 via Bluetooth. Said pairing information may be stored in a memory 304 of the user computing device 108 by the Bluetooth module for automatic pairing each time the user 106 operates the vehicle 102. Further, the geolocation module of the user computing device 108 may have identified and stored the most commonly visited locations and or driving patterns of the user 106 in the memory 304. So, in said example, when the user 106 accesses the privacy client application 314, the privacy client application 314 may be configured to operate in concert with the geolocation and Bluetooth module and use the data stored in the memory 304 to determine if the user computing device 108 is paired with a different vehicle other than the ones with which the user 106 generally interacts, if the user 106 is outside of the commonly visited locations, and/or the driving pattern of the user 106 is different from the usual driving patterns. If the user 106 is in a different location such as the location of a rental agency or if the user computing device 108 is paired to a vehicle associated to a rental agency, the privacy client application 314 may be configured to prompt the user to confirm that the vehicle 102 is a rental vehicle and/or provide/confirm the name of the rental agency, etc. In some example, by virtue of being connected to the vehicle 102 (i.e., systems of the vehicle (e.g., infotainment, etc.)), the privacy client application 314 may be able to retrieve the VIN number of the vehicle 102 and thereby a history associated with the vehicle 102 which can then be confirmed by the user 106. It is noted that the privacy client application 314 is configured to notify and/or receive consent from the user 106 prior to automatically retrieving any vehicle related information for the purpose of generating a privacy rating.

Responsive to receiving the vehicle identification information and/or the secondary information, in operation 408, the processor 206 of the privacy server 112 may operate in concert with the vehicle identification module 226 and the vehicle unit determination module 228 of the privacy rating engine 260 to determine: (a) the vehicle 102, (b) in-vehicle units 104 associated with the vehicle 102, and (c) entities associated with the vehicle 102 and in-vehicle units 104 that are involved in handling the personal data of the user 106. Operation 408 will be described in greater detail below, in association with FIG. 6.

Referring to FIG. 6, the data acquisition process 600 begins with operation 602. In operation 602, the vehicle identification module 226 of the privacy server 112 may be configured to uniquely identify the vehicle 102 based on the vehicle identification information received from the user computing device 108. Responsive to identifying the vehicle 102 (e.g., make, model, year, trim, etc. of the vehicle 102), the vehicle identification module 226 may operate in concert with the vehicle unit determination module 228 to determine all the in-vehicle units 104 and/or all the entities (e.g., manufacturer, assembler, etc.) associated with the vehicle 102 that handle personal data of the user 106. In some example embodiments, the in-vehicle unit 104 and/or entities associated with the vehicle 102 may be determined from digital web content (e.g., websites) associated with the vehicle 102 such as, but not limited to, the vehicle manufacturers website. Further, in operation 604, the vehicle identification module 226 and the vehicle unit determination module 228 may operate in concert to identify and analyze digital web content associated with each in-vehicle unit 104 of the vehicle 102 to determine entities (e.g., OEMs, third party service providers, etc.) associated with the in-vehicle unit 104 that handle the personal data of the user 106. Furthermore, in operation 606, the vehicle identification module 226 and the vehicle unit determination module 228 may operate in concert to identify and analyze digital web content associated with the entities (i.e., entities associated with the vehicle and each in-vehicle unit) to determine all the vehicles that have a particular in-vehicle unit 104 and/or to identify partners of each entity (e.g., entities with which the personal data is shared) that are associated with handling the personal data of the user. In other words, the vehicle information is used to identify in-vehicle units 104 associated with the vehicle 102. Then, information associated with the in-vehicle units 104 are gathered to determine all vehicles 102 having said in-vehicle units 104, thereby achieving a circular verification process. The circular verification process where the vehicle information is used to identify in-vehicle units 104 of the vehicle 102, and using in-vehicle unit information to identify all vehicles (including vehicle 102 of interest) that have said in-vehicle units 104 improves the accuracy of the data acquisition process 500. Responsive to completing the data acquisition process 500, the data acquisition process 600 returns to operation 410 of FIG. 4.

In one example embodiment, an Internet bot (e.g., web crawler) may be used to automatically crawl/browse the digital web pages referenced in operations 602-606. The Internet bot may be a software application that runs automated tasks over the Internet. That is, in operations 602-606, a web crawler may be configured to crawl the webpages associated with the vehicle manufacturer, OEMs associated with the in-vehicle units, partners of the manufacturer and/or OEMs, etc. In another example embodiment, the privacy server 112 may be configured to query one or more of the privacy sources 114 to obtain data associated with the vehicle 102, in-vehicle units 104, and/or the personal data handling approaches thereof.

In some example embodiments, the digital web content (i.e., text of the webpage) may be semantically analyzed using artificial intelligence (natural language processing and/or machine learning) to determine the in-vehicle units 104 of a vehicle 102, entities associated with the vehicle 102, and/or partners associated with the entities that handle personal data of the user 106. Additionally, in operations 602-606, the digital web content (i.e., text of the webpage) may be semantically analyzed using artificial intelligence to automatically retrieve personal data handling approaches (i.e., the text of the privacy policies, privacy practices, privacy features, etc.) of the entities associated with the vehicle 102 and/or the in-vehicle units 104. That is, in operations 602-606, in addition to identifying the entities (e.g., manufacturers, OEMs, third parties, partners, etc.) associated with the vehicle 102 and/or the in-vehicle units 104, said bots may fetch text or documents associated with the personal data handling approaches from various websites and may provide the fetched data to the privacy server 112.

Upon receipt of the personal data handling approaches, the privacy server 112 may store the text and an associated source information in the privacy policy database 210. In some example embodiments, personal data handling approaches may be identified amongst other types of web pages based on a set of regular expressions, assuming that a personal data handling approach (e.g., privacy policy, ToS, etc.) may be detected according to the presence of certain key-words and patterns. If the number of regular expressions identified in a web page is greater than a certain threshold, then it may be tagged as being associated with personal data handling approaches. In other example embodiments, any other appropriate methods may be used to identify and retrieve the personal data handling approaches. In one or more example embodiments, each personal data handling approach (i.e., documents associated therewith) stored in the privacy policy database 210 may be linked to/associated with an in-vehicle unit 104 and/or a vehicle 102.

Returning to FIG. 4, in operation 410, the privacy server 112 may operate in concert with the privacy client application 314 of the user computing device 108 to determine which ones of the plurality of in-vehicle units 104 are currently active and/or have been de-activated (e.g., by the user 106, or past subscription period, etc.). In one example embodiment, the vehicle unit determination module 228 of the privacy server 112 may send a request to the user computing device 108 to determine the in-vehicle units 104 that are active and inactive. The request may include a list of in-vehicle units 104 associated with the vehicle 102 determined as part of the data acquisition process 600. Responsive to receiving the request, the privacy client application 314 of the user computing device 108 may operate in concert with the user interface module 308 and the display 310 to generate a user interface that prompts the user 106 to select the in-vehicle units 104 that are active and the in-vehicle units 104 that are inactive. Identifying the in-vehicle units 104 that are active and inactive helps to generate a more customized and accurate privacy rating for the vehicle 102. In some example embodiments, the user computing device 108 may be communicatively coupled (e.g., paired or connected) to the vehicle 102 (i.e., the different in-vehicle units 104 thereof). As such, information regarding the in-vehicle units 104 that are active may be automatically determined by the privacy client application 314 by identifying the in-vehicle unit 104 that are communicatively coupled to the user computing device 108. Alternatively, the in-vehicle units 104 that are active may be determined both automatically and/or based on input from the user 106. It is noted that in some example embodiments, operation 410 may be omitted. That is, operation 410 is optional. In said example embodiments where operation 410 is omitted, a general privacy rating may be generated for the vehicle 102 based on the assumption that all the in-vehicle units 104 associated with the vehicle 102 identified by the data acquisition process 600 are active.

In some example embodiments, in addition to requesting the user 106 to provide information regarding in-vehicle units 104 that are active and/or inactive, the privacy client application 314 may be configured to request the user 106 to confirm that the list of the in-vehicle units 104 identified by the data acquisition process 600 is accurate. Further, the privacy client application 314 may be configured to request the user 106 to confirm that vehicle 102 and the entities associated with the vehicle 102 and/or in-vehicle units 104 (e.g., ones that handle personal data of the user 106) identified as part of the data acquisition process 600 are accurate. If a certain in-vehicle unit 104 identified as part of the data acquisition process 600 is not present in the vehicle 102, or if the vehicle 102 and/or entities identified as part of the data acquisition process 600 are inaccurate; said information may be provided as feedback to privacy server 112. The feedback may be used by the artificial intelligence algorithms associated with the data acquisition process 600 to learn, adapt, and improve accuracy of the process 600.

Responsive to determining the in-vehicle units 104 that are active, said information may be transmitted to the privacy server 112. In operation 412, the privacy data retrieval module 216 of the privacy server 112 may be configured to retrieve personal data handling approaches (i.e., documents and/or texts associated therewith/defining the personal data handling approaches) associated with the vehicle 102 and/or each active in-vehicle unit 104. The personal data handling approaches may be retrieved from the privacy policy database 210. Then, in operation 414, the retrieved personal data handling approaches may be provided as input to the privacy rating machine learning models created in operation 402. In one or more example embodiments, prior to providing the personal data handling approaches as input to the privacy rating machine learning models, the text preparation module 218 may be configured to process the text associated with the personal data handling approaches. The processing may include, but is not limited to, cleaning the text (e.g., removing HTML tags, stop words, and punctuations; stemming, etc.), formatting the text, converting the text to feature vectors using natural language processing, etc.

Once the personal data handling approaches are provided as input to the privacy rating machine learning models, in operation 416, the privacy rating machine learning models may be configured to assign a rating/score for one or more attributes and/or sub-attributes of each personal data handling approach. In one example embodiment, the privacy rating machine learning models may be configured to generate a rating/score for three main attributes (and/or sub-attributes) associated with a personal data handling approaches as described above in association with operation 402 of FIG. 4. In other words, in said example embodiment, responsive to receiving personal data handling approaches (i.e., text or document), the privacy rating machine learning models created in operation 402 are configured to generate a rate/score for the: (a) accessibility related attributes, (b) attributes associated with data privacy aspects of the personal data handling approaches with respect to highly sensitive personal data, and/or (c) attributes associated with privacy related features of the in-vehicle unit or the vehicle. It is noted that the three main attributes described above are examples and are not limiting. That is, in other example embodiments, the privacy rating machine learning models may be configured to generate a rating/score for fewer or more than three attributes associated with a personal data handling approaches without departing from a broader scope of the present disclosure. Further, as described above in association with operation 402, in some examples, one or more attributes of the personal data handling approaches may be rated or scored without using a machine learning model.

Responsive to generating a rating/score for one or more attributes (and/or sub-attributes) of each personal data handling approach, in operation 418, the rating module 230 may be configured to retrieve the user preferences associated with the user 106. Further, in operation 418, the rating module 230 may assign weights to each sub-attribute, attribute, and/or personal data handling approach based on the user preferences. For example, if a user has ranked the accessibility attribute as being of lower importance relative to the data privacy aspects attribute with respect to highly sensitive personal data, a lower weight may be assigned to the accessibility attribute compared to that of the data privacy aspects attribute with respect to highly sensitive personal data. In some examples, the weights for the attributes and sub-attributes of a personal data handling approach may be assigned based on user-preference; and weights for each personal data handling approach may be assigned based on the user preference and/or at least a portion of the secondary information. For example, different weights may be assigned to a personal data handling approach of Carvana vs Local dealership vs Enterprise. The weights may be used to influence the overall privacy rating/score. The assigned weights are multiplied with the score for each sub-attribute, attribute, and/or the personal data handling approach; and the results are summed (or averaged or combined in any appropriate manner) to create an overall privacy rating/score for the vehicle 102. The weights give each sub-attribute, attribute, and/or personal data handling approach a larger or smaller impact on the final score based on attributes that are more or less important. A representative example will be discussed below to help give a more concrete representation of these concepts.

An overall privacy rating/score for the vehicle that is based on personal data handling approaches of different entities associated with the vehicle 102 and/or the in-vehicle units 104 creates an incentive for entities to push each other to improve their personal data handling approaches even down to the level or various attributes and sub-attributes. For example, the privacy rating/score of Ford Focus may depend on the individual privacy rating/score of personal data handling approaches (e.g., privacy policies, practices, features, etc.) of Ford, Sirius XM service provider, OnStar service provider, Bose infotainment system, Sync 3 online functionality service, etc. In said example, a low privacy rating/score of personal data handling approaches or a data collection attribute of the personal data handling approach associated with at least one of the entities listed above will lower the overall privacy rating/score for Ford Focus. As such, there is incentive for Ford Motors to push/drive itself and other entities listed above to improve their personal data handling approaches (and attributes or sub-attributes associated therewith) and thereby increase the overall privacy rating/score for Ford Focus.

In one example, in operations 414-418, the model application module 226 may generate a rating/score for each sub-attribute of each attribute of each personal data handling approach. Then, the rating/score associated with each sub-attribute may be multiplied with a weight value that is assigned to the respective sub-attribute. Responsively, the weighted ratings/scores of the sub-attributes of an attribute are combined to create the rating/score for an attribute of a personal data handling approach. Similarly, ratings/score for each of the other attributes of the personal data handling approach may be created. The rating/score of each attribute of the personal data handling approach may be multiplied with a weight value that is assigned to the respective attribute. The weighted ratings/score of the attributes of the personal data handling approach are combined to create the rating/score for the personal data handling approach. Similarly, ratings/score for each of the personal data handling approaches of a vehicle and/or in-vehicle unit may be created. Further, the rating/score of each personal data handling approach may be multiplied with a weight value that is assigned to the respective personal data handling approach. The weighted ratings/scores of the personal data handling approaches are combined to create the privacy rating/score for the vehicle. In the above example, the weights may be normalized and can be between 0 and 1 (including both 0 and 1). The said example of generating a privacy rating/score for a vehicle may be represented by the following formula:

$$S_v = \sum_{i=0}^{n} \left( W_{pa_i} \cdot \sum_{j=0}^{m} \left( W_{a_j} \cdot \sum_{k=0}^{o} (W_{sa\_k} \cdot (S_{sa_k})) \right) \right)$$

where, $S_a = \sum_{k=0}^{o} (W_{sa\_k} \cdot (S_{sa_k}))$ $S_{pa} = \sum_{j=0}^{m} (W_{a\_j} \cdot (S_{s_j}))$ i=number of different personal data handling approaches associated with the vehicle and/or in-vehicle units
j=number of attributes associated with each personal data handling approach
k=number of sub-attributes associated with each attribute
$W_{pa}$=weight value assigned to a personal data handling approach
$W_a$=weight value assigned to an attribute
$W_{sa}$=weight value assigned to a sub-attribute $S_{pa}$=Rating/Score of a personal data handling approach
$S_a$=Rating/Score of an attribute
$S_{sa}$=Rating/Score of a sub-attribute
$S_v$—Privacy rating/score (Overall privacy rating/score) of vehicle In some examples, while each sub-attribute may be assigned a weight and multiplied with said weight to generate the weighted ratings/scores of the sub-attributes, the steps of assigning weights and generating weighted ratings/score for the attributes and/or personal data handling approaches may be optional.

Responsive to generating the privacy rating/score for the vehicle 102, in operation 416, the privacy rating/score for the vehicle 102 is transmitted to the user computing device 108 for presentation to the user 106. In addition to presenting the privacy rating/score of the vehicle 102 to the user 106, the privacy client application 314 of the user computing device 108 may provide an interactive user interface that allows the user 106 to drill down and view the privacy rating/score associated with each personal data handling approach, and each attribute or sub-attribute thereof. Further, in some examples, the privacy client application 314 may operate in concert with the privacy server 112 to present, inter alia, other vehicles having similar or a higher privacy rating/score.

In operations 420-426, the privacy client application 314 of the user computing device 108 may be configured to dynamically adjust the privacy rating/score of the vehicle based on various privacy change factors such as, but not limited to, usage status of the various in-vehicle units, personal data handling practices of the entities associated with the vehicle and/or the in-vehicle units that handle the personal data of the user, etc. In one example embodiment, in operation 420, the privacy client application 314 may be configured to present a user interface that prompts a user 106 to provide information on any changes to the usage status of the various in-vehicle units 104 of the vehicle 102. For example, the user 106 may be presented with a screen that requests the user to identify any new in-vehicle units 104 that have been added or activated, or any in-vehicle units that have been deactivated. If any new in-vehicle units have been added and/or activated, the user 106 may be prompted to provide information regarding the new in-vehicle unit 104. Responsive to receiving an input from the user 106, in operation 422, information regarding the new in-vehicle unit 104 may be transmitted to the privacy server 112. Further, in operation 422, the rating adjustment module 234 of privacy server 112 may dynamically adjust the privacy rating/score of the vehicle 102 based on the personal data handling approaches associated with the new in-vehicle unit 104. It is noted that operations 408-414 may be followed to adjust the privacy rating/score (or generate the new privacy rating/score) of the vehicle 102. Similarly, if any existing in-vehicle units have been deactivated, the privacy server 112 may be configured to adjust the privacy rating/score of the vehicle 102.

Alternatively or in addition to requesting information regarding changes to the usage status of in-vehicle units 104, in operation 420, the privacy client application 314 may be configured to receive feedback from a user 106 regarding whether the privacy rating/score for the vehicle 102 meets the privacy rating/score threshold of the user 106. Responsive to determining that the current privacy rating/score for the vehicle 102 does not meet the privacy rating/score threshold of the user 106, the privacy client application 314 may be configured to provide the user 106 with an option to adjust the privacy rating/score for the vehicle 102.

In particular, the privacy client application 314 may be configured to operate in concert with the privacy server 112 to generate recommendations/suggestions (interchangeably referred to as 'actions') that may help to increase the privacy rating/score of the vehicle 102. For example, the privacy client application 314 may suggest the user 106 to: de-activate some of the in-vehicle units 104 that have poor personal data handling approaches in general; send requests to an entity that handles the personal data of the user to stop handling the personal data of the user 106; file a data privacy breach complaint; use a different dealership or rental agency; change the model, trim, and year of the vehicle; switch an in-vehicle unit with a similar in-vehicle unit from a different entity having better personal data handling approaches; etc. It is noted that the example suggestions listed above are non-limiting, and other appropriate suggestions may be provided without departing from a broader scope of the present disclosure. In some embodiments, the privacy client application 314 and the privacy server 112 may operate in concert to provide an explanation or a list of factors that may be affecting the privacy rating/score of the vehicle 102.

In operation 420, responsive to determining that the usage status of the various in-vehicle units 104 has not changed, the privacy rating generation process 400 proceeds to operation 424. In operation 424, the privacy client application 314 may be configured to determine whether a request has been received from a user 106 associated with the vehicle 102 and/or the in-vehicle units 104 regarding a desired change in control of the user's personal data by the entities associated with the vehicle 102 and/or the in-vehicle units 104. In particular, in operation 424, the privacy client application 314 may be configured to generate a user interface that provides an option for the user 106 to place requests to one or more entities (associated with the vehicle 102 and/or in-vehicle units 104) that handle the personal data of the user to change how the user's personal data is handled. If the user 106 places (i.e., initiates or inputs) a request, the user computing device 108 may transmit the request to the privacy server 112. Further, in operation 424, the privacy compliance module 232 may generate and transmit a formal request with the concerned entities on behalf of the user 106 and based on the request received from the user 106. In other words, the privacy rating system operates as a privacy mediation platform between the user 106 and the entities associated with the vehicle 102 and/or in-vehicle units 104 that handle the personal data of the user 106.

Responsive to transmitting the formal request on behalf of the user 106, in operation 426, the privacy compliance module 232 may initiate a timer to determine whether the concerned entities respond to the formal request within a given timeframe. If the concerned entities respond to formal request within the given timeframe, the privacy compliance module 232 may operate in concert with the rating adjustment module 234 to adjust the privacy rating/score of the vehicle based on the response. If the concerned entities respond to formal request within the given timeframe, an extension may be provided for responding. If the concerned entities do not respond to formal request within the extended timeframe, the privacy compliance module 232 may operate in concert with the rating adjustment module 234 to dynamically adjust the privacy rating/score of the vehicle based on the lack of response. Further, the privacy compliance module 232 may generate and file a complaint with the privacy regulating bodies and/or other concerned authorities.

In some example embodiments, the response from the concerned entities may be analyzed and rated/scored using natural language processing and machine learning models (or alternatively using non-artificial intelligence based methods). The privacy rating/score may be adjusted based on the rating/score associated with the response from the concerned authorities.

For example, the user 106 may request Ford Motors to stop collecting and/or storing the user's personal data via the privacy client application 314. Responsively, the user computing device 108 may transmit the request to the privacy server 112 which in turn generates and transmits a formal request to Ford Motors on behalf of the user 106. Further, the privacy server 112 may provide 30 days and an extension of an additional 30 days to Ford Motors for responding to the request. Based on the response or lack of response from Ford Motors, the privacy rating/score associated with the Ford Explorer associated with the user 106 may be adjusted. If Ford Motors complies with the request, the privacy rating/score may be increased, and the compliance may further affect the privacy rating/score for other Ford vehicles as well. If Ford Motors complies with and responds to a threshold number of requests from the user, the privacy rating/score of the personal data handling approaches of Ford Motors may be increased in general.

In operation 424, if the privacy client application 314 determines that no request has been received from the user 106 with regards to a change in control of the personal data of the user 106, the privacy rating generation process 400 of the privacy rating system 100 may end in operation 430.

It is noted that the privacy change factors described above are examples and are non-limiting. In other words, the privacy rating generation process 400 may be configured to adjust the privacy rating/score of the vehicle based on fewer or more privacy change factors without departing from a broader scope of the present disclosure. For example, it should be appreciated that personal data handling approaches may change over time, and that such changes may be relevant to the privacy rating/score of the vehicle. The privacy server 112 may be configured to detect a change to a previously scored personal data handling approach and, in response to detecting the change, the privacy server 112 may be configured to dynamically adjust the privacy rating/score of the vehicle (e.g., in real-time based on any of the privacy change factors). In some embodiments, the privacy server 112 may retrieve the personal data handling approach from the website via the Internet bot or said personal data handling approach may be sent to the privacy server 112 by the appropriate source 114. The privacy server 112 may be configured to review the personal data handling approaches periodically. Responsive to obtaining the personal data handling approach, the privacy server 112 may verify the personal data handling approach against the stored personal data handling approach to detect any changes, and may return the privacy rating/score to the user computing device 108 when no changes are detected. If a change is detected, the privacy server 112 may analyze the change, determine an adjusted privacy rating/score, and send the adjusted privacy rating/score to the user computing device 108 along with an indication of the change for presentation to the user 102.

It is noted that even though the present disclosure describes a system for generating privacy rating/scores for vehicle, one of skill in the art can understand and appreciate that the system of the present disclosure can also be used to generate privacy ratings/score for other complex systems such as, but not limited to, Internet of Things (IoT) devices.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A vehicle data security method, comprising the steps of:
generating, using artificial intelligence algorithms and a training dataset, at least one machine learning model that is configured to generate scores for multiple attributes of one or more personal data handling approaches associated with a vehicle and/or an in-vehicle unit of the vehicle that handles personal data of a user,
wherein the training dataset comprises a plurality of labelled documents that define the one or more personal data handling approaches associated with the vehicles and/or the in-vehicle unit, and wherein each labelled document has scores pre-assigned to one or more of the multiple attributes of the respective personal data handling approach associated therewith;
receiving vehicle identification information;
determining one or more personal data handling approaches associated with a target vehicle linked to the vehicle identification information and at least one in-vehicle unit of the target vehicle that handles personal data of the user;
semantically analyzing the one or more personal data handling approaches associated with the target vehicle and the at least one in-vehicle unit of the target vehicle;
generating, using the at least one machine learning model and the one or more personal data handling approaches that have been semantically analyzed, scores for the multiple attributes of each of the one or more personal data handling approaches; and
processing the scores to generate a privacy score for the target vehicle.

2. The method of claim 1, further comprising the step of generating a comparison between the target vehicle and a second vehicle having a second privacy score, wherein the second privacy score for the second vehicle is equal to or greater than the privacy score for the target vehicle.

3. The method of claim 1, wherein the one or more personal data handling approaches comprises one or more of privacy policies and terms of services.

4. The method of claim 1, wherein the one or more personal data handling approaches are semantically analyzed using natural language processing algorithms that are configured to generate feature vectors from the one or more personal data handling approaches.

5. The method of claim 1, wherein the artificial intelligence algorithms comprise natural language processing algorithms and machine learning algorithms, and wherein the vehicle identification information is received from a user computing device.

6. The method of claim 1, further comprising the step of generating at least one of actions associated with the privacy score and actions that can be performed to change the privacy score of the vehicle.

7. The method of claim 1, further comprising the step of generating requests for delivery to entities associated with the target vehicle and/or the in-vehicle unit that handles the personal data of the user, the requests comprising a request to change how a user's personal data is handled.

8. A vehicle data security method, comprising the steps of:
generating, using artificial intelligence algorithms and a training dataset, at least one machine learning model that is configured to generate a privacy score associated with a vehicle and/or an in-vehicle unit of the vehicle that handles personal data of a user,
wherein the training dataset comprises a plurality of labelled documents that define one or more personal data handling approaches associated with the vehicles and/or the in-vehicle unit, and wherein each labelled document has scores pre-assigned to the respective personal data handling approach associated therewith;
receiving vehicle identification information;
determining one or more personal data handling approaches associated with a target vehicle linked to the vehicle identification information and at least one in-vehicle unit of the target vehicle that handles personal data of the user;
semantically analyzing the one or more personal data handling approaches associated with the target vehicle and the at least one in-vehicle unit of the target vehicle;
generating, using the at least one machine learning model and the one or more personal data handling approaches that have been semantically analyzed, a privacy score for the target vehicle; and
dynamically adjusting the privacy score for the target vehicle based on privacy change factors.

9. The method of claim 8, wherein the artificial intelligence algorithms comprise natural language processing algorithms and machine learning algorithms, and wherein the vehicle identification information is received from a user computing device.

10. The method of claim 8, wherein the one or more personal data handling approaches comprises one or more of privacy policies and terms of services.

11. The method of claim 8, wherein the one or more personal data handling approaches are semantically analyzed using natural language processing algorithms that are configured to generate feature vectors from the one or more personal data handling approaches.

12. The method of claim 8, wherein the privacy change factors comprise at least one of a usage status of the in-vehicle units and personal data handling practices of entities associated with the target vehicle and/or the at least one in-vehicle unit that handle the personal data of the user.

13. The method of claim 8, further comprising the step of generating at least one of actions associated with the privacy score and actions that can be performed to change the privacy score of the vehicle.

14. The method of claim 8, further comprising the step of generating requests for delivery to entities associated with the target vehicle and/or the in-vehicle unit that handles the personal data of the user, the requests comprising a request to change how a user's personal data is handled.

15. The method of claim 8, further comprising the step of generating a comparison between the target vehicle and a second vehicle having a second privacy score, wherein the second privacy score for the second vehicle is equal to or greater than the privacy score for the target vehicle.

16. A vehicle data security method, comprising the steps of:
generating, using artificial intelligence algorithms and a training dataset, at least one machine learning model that is configured to generate scores for multiple attributes of one or more personal data handling approaches associated with a vehicle and/or a service provider associated with the vehicle that handles personal data of a user,
wherein the training dataset comprises a plurality of labelled documents that define the one or more personal data handling approaches associated with the vehicles and/or the service provider, and wherein each labelled document has scores pre-assigned to one or more of the multiple attributes of the respective personal data handling approach associated therewith;
receiving vehicle identification information;
determining one or more personal data handling approaches associated with a target vehicle linked to the vehicle identification information and at least one service provider of the target vehicle that handles personal data of the user;
semantically analyzing the one or more personal data handling approaches associated with the target vehicle and the at least one service provider of the target vehicle;
generating, using the at least one machine learning model and the one or more personal data handling approaches that have been semantically analyzed, scores for the multiple attributes of each of the one or more personal data handling approaches;
processing the scores to generate a privacy score for the target vehicle; and
dynamically adjusting the privacy score for the target vehicle based on privacy change factors.

17. The method of claim 16, wherein the one or more personal data handling approaches comprises one or more of privacy policies and terms of services.

18. The method of claim 16, further comprising the step of generating at least one of actions associated with the privacy score and actions that can be performed to change the privacy score of the vehicle.

19. The method of claim 16, further comprising the step of generating requests for delivery to entities associated with the target vehicle and/or the service provider that handles the personal data of the user, the requests comprising a request to change how a user's personal data is handled.

20. The method of claim 16, further comprising the step of generating a comparison between the target vehicle and a second vehicle, wherein the second vehicle has a second privacy score that is equal to or greater than the privacy score for the target vehicle.

* * * * *